United States Patent
Schneider et al.

(10) Patent No.: US 7,219,407 B2
(45) Date of Patent: May 22, 2007

(54) DEVICE FOR MILLING AND LATHING

(75) Inventors: Gunther Schneider, Marburg (DE); Helwig Buchenauer, Dautphetal-Buchenau (DE); Klaus Kraemer, Dautphetal-Friedensdorf (DE)

(73) Assignee: Schneider GmbH & Co. KG, Steffenberg (DE)

( * ) Notice: Subject to any disclaimer, the term of this patent is extended or adjusted under 35 U.S.C. 154(b) by 0 days.

(21) Appl. No.: 10/964,036

(22) Filed: Oct. 13, 2004

(65) Prior Publication Data

US 2005/0188516 A1  Sep. 1, 2005

(30) Foreign Application Priority Data

Oct. 14, 2003  (DE) .................. 103 48 459

(51) Int. Cl.
*B23B 25/00* (2006.01)
(52) U.S. Cl. .............................. 29/27 C; 29/28; 82/1.1; 82/1.11
(58) Field of Classification Search ................ 29/27 C, 29/27 R, 27 A, 28; 82/1.3, 1.11, 117, 118, 82/119.12, 121, 124, 128, 129, 133, 134
See application file for complete search history.

(56) References Cited

U.S. PATENT DOCUMENTS

| | | | |
|---|---|---|---|
| 4,343,206 A * | 8/1982 | Douglass et al. ............. 82/117 |
| 4,571,796 A * | 2/1986 | Sellner et al. ............... 29/27 R |
| 4,612,832 A * | 9/1986 | Ushigoe et al. ............... 82/129 |
| 4,679,471 A * | 7/1987 | Wauchope et al. ............. 82/12 |
| 4,745,672 A * | 5/1988 | Sealey et al. ................. 29/558 |
| 5,217,335 A * | 6/1993 | Houchens et al. ............ 409/80 |
| 5,402,607 A | 4/1995 | Lombard ........................ 451/5 |
| 5,485,771 A * | 1/1996 | Brennan et al. ............. 82/1.11 |
| 5,586,848 A * | 12/1996 | Suwijn ....................... 409/137 |
| 5,765,456 A * | 6/1998 | Grossmann ................. 29/27 C |
| 6,122,999 A * | 9/2000 | Durazo et al. ............... 82/1.11 |
| 6,186,024 B1 * | 2/2001 | Leiber ...................... 74/490.09 |
| 6,626,075 B2 * | 9/2003 | Hirose et al. ................. 82/118 |

FOREIGN PATENT DOCUMENTS

| | | |
|---|---|---|
| DE | 42 30 979 A1 | 3/1993 |
| DE | 196 50 360 A1 | 5/1998 |
| EP | 13 23 497 A2 | 7/2003 |

* cited by examiner

*Primary Examiner*—Dana Ross
(74) *Attorney, Agent, or Firm*—Darby & Darby

(57) ABSTRACT

A device for milling and/or lathing workpieces including at least one machine bed, on which there is at least one tool holder and one workpiece spindle as part of a workpiece holder with an axis of rotation, whereby the tool holder has at least one tool drive with an axis of oscillation running parallel to the axis of rotation, whereby the workpiece holder and the tool holder can travel relative to each other in the direction of an axis of translation that runs at a right angle to the axis of oscillation. The workpiece holder has a linear drive that can travel in the direction of the axis of translation.

9 Claims, 3 Drawing Sheets

DEVICE FOR MILLING AND LATHING

The invention relates to a device for milling and/or lathing workpieces comprising at least one machine bed, on which there is at least one tool holder and one workpiece holder with an axis of rotation R1, whereby the tool holder has at least one tool drive with an axis of oscillation O1 running parallel to the axis of rotation R1, whereby the workpiece holder and the tool holder can travel relative to each other in the direction of an axis of translation T1 that runs at a right angle to the axis of oscillation O1.

BACKGROUND

European Patent Application EP 1 323 497 A3 discloses a machine for the production of optically active surfaces with an electronically speed-controlled workpiece receptacle that can be rotated around a C-axis and that has a tool carriage which, relative to the C-axis, can move in the radial direction of an X-axis and in the axial direction of a Z-axis. Here, for the axial feed movement, there is a linear motor and for the X-, Z- and C-axes, there is a control processor that controls the position of the Z-axis, the position of the X-axis as well as the rotation of the C-axis. In addition, the axes are arranged essentially vertically or else they span a vertical machining plane. In addition to the axis of translation x, the tool receptacle also has the oscillating axis z.

SUMMARY OF THE INVENTION

An object of the present invention is to configure and arrange a device for machining workpieces in such a way that optimal machining by lathing and/or milling is ensured.

The present invention provides a device that includes a workpiece holder that has a linear drive that can travel in the direction of the axis of translation T1. As a result, the two axes of translation needed for the machining process, that is to say, T1 and O1, are controlled separately and thus have independent drives. The axis of translation T1 is associated with the workpiece holder, whereas the axis of oscillation O1 is associated with the tool holder and is thus arranged on the machine bed so as to be spatially separated. The spatial separation also leads to reduced vibration transmission from one axis to the other, so that a more precise control or machining is possible. separated. The spatial separation also leads to reduced vibration transmission from one axis to the other, so that a more precise control or machining is possible.

Here, a control processor that controls the relative position is provided for the axis of rotation R1, the axis of oscillation O1 and the axis of translation T1, whereby the axis of rotation R1 is phase-regulated and the control processor generates position dependencies between the axis of rotation R1, the axis of oscillation O1 and the axis of translation T1. In addition, a constant adjustment of the actual value-target value dependency of the various axes is effectuated by the measuring systems of the individual axes. For this purpose, each individual axis drive or its actuation entails appropriate dynamism reserves so that an appropriate adjustment of each axis to the target preset value is possible. The coordination of the three axes thus achieved ensures a highly dynamic and precise machining sequence. This approach avoids a sequence control of the type already known in the state of the art, in which an axis serves as the preset value for the other axes.

In this context, it is also advantageous that a plane M spanned by the machine bed subtends an angle α between 40° and 60°, especially 50°, with the horizontal. The machine bed created in this manner ensures the formation of a chip space that extends in the vertical as well as in the horizontal direction and that ensures an optimal height of fall for the chips. Moreover, in spite of the large-surface machine bed, the tool holder and the workpiece holder are well accessible manually and the height of the machine is limited. The length of the machine bed thus created allows the positioning of the two process stations for milling and lathing as well as an automated workpiece replacement.

An additional possibility according to an embodiment is that the machine bed has a chip space or chip-removal space that is arranged at least below the workpiece and that, relative to the axis of oscillation O1, is positioned between the workpiece holder and the tool holder. Consequently, the chips do not fall onto the workpiece, the tool holder or any other gear member of the machine. The particular tool or the particular tool cutting edge is situated overhead so that the chips being formed are released or detached downwards in the direction of the force of gravity and in the direction of the chip space. The formation of the chips and their subsequent removal take place in an essentially vertical direction. Here, the coolant or cutting fluid that flows or drips down into the chip space assists the removal of the chips. The chips are removed by the rinsing effect in general and by a rinsing of the chip space or of its slanted surfaces in particular. The extension of the chip space in the radial direction, that is to say, towards the top, the back and the front, prevents the risk of accumulation or swirling of the chips and resultant clogging. Furthermore, the chip space ensures an optimal height of fall of the chips so that the cut chips are removed as quickly as possible from the machining zone at an appropriate safety distance from said zone.

Furthermore, it is advantageous for the tool holder to have a lathe chisel unit and a milling unit which can be coupled individually or jointly to one or more tool drives or else they can be locked in a parked position P on the machine bed. The tool drive can be associated with both, namely, the lathe chisel unit and the milling unit, whereby preferably the lathe unit is to be coupled only to the drive and the milling unit only together with the lathe unit. Thus, the lathe unit is firmly affixed to the drive. Since the milling procedure or the movement in the direction of the axis of oscillation O1 during the milling has a much lower frequency than during the lathing, this oscillating milling movement can be mastered by the one drive, in spite of the two weights of the lathe unit and the milling unit. The milling procedure involves a much higher feed rate which, at a lower rotational speed of the workpiece, leads to considerably more material removal. In addition, there is one drive for each unit, whereby the units are each connected individually to the drive, while the other unit is positioned in a parked position on the machine bed. Greater dynamism is ensured, thanks to the weight advantage of each individual pairing of the unit with the drive. The coupling of the two units to the shared drive is no longer necessary.

The machine thus configured combines a lathe machine and a milling machine in such a way that both machining procedures are possible while ensuring an optimum performance quality. The dynamism of the machine needed for lathing, especially pertaining to the axis of oscillation O1 and the axis of rotation R1, likewise ensures that the milling procedure has a dynamism or speed not encountered so far. This dynamism allows greater rotational speeds of the workpiece and thus shorter machining times. The tool drive, along with its control, is used for both units separately, so that the individual axes of oscillation O1 of the lathe unit and of the milling unit actually have their own drive or their own control and thus both processes can be controlled precisely and independently of each other.

The polishing of the workpiece normally carried out after the cutting procedure can be dispensed with, depending on the surface quality of the cutting or milling procedure. In any case, the polishing phase should be kept as short as possible so that the undesired material burrs are removed, but the geometry of the workpiece is not unnecessarily affected or even changed. In an advantageous manner, the workpiece is machined by lathing once more after the milling so that, as a rule, polishing is only needed very briefly or not at all. In this case, the lathing is limited to the lens surface, whereby the edge surface and/or a transition surface or chamfer can also be lathed once again as needed.

Milling offers the advantage of a very large and relatively fast material removal, whereby this is essentially limited by the speed of the milling tool. However, lathing ensures better surface qualities that allow a "final cut" machining without polishing. These highest surface qualities are attained with a feed rate of the cutting machining between 1 μm and 50 μm. In order to still attain feasible production times even with such low feed rates, there is a need for a corresponding increase in the rotational speed of the workpiece and thus a corresponding dynamism of the axis of oscillation O1, which is, in fact, provided by the arrangement according to the invention. The combination of both methods in one machine, while ensuring the requisite precision, translates into extremely fast and high-quality production.

It is also advantageous for the linear drive to be configured as a spindle drive or as a linear motor and for the workpiece drive to be configured as a linear motor. When a shared drive is used, the linear motor has two primary components and one rotor with two secondary parts arranged on both sides, one of which receives the control signal and the other of which receives the inverted control signal. The motor formed in this manner, with one rotor and one double secondary part, generates twice as much drive force.

Finally, according to a preferred embodiment of the solution according to the invention, it is provided that the linear motor has a rotor that is translatorily supported via at least one rolling-element bearing arranged on at least one bearing rail of the rotor, a hydrostatic bearing or a pneumatically static bearing. The use of a hydrostatic bearing or of a pneumatically static bearing prevents a transition effect or static friction effect of the rolling elements, which would be noticeable with each movement reversal due to the oscillating movement of the axis O1. Therefore, in order to ensure an optimum control, only the known or calculable weight behavior of each tool holder and of the motor rotor has to be taken into account.

It is of special importance in the present invention for the axis of oscillation O1, the axis of rotation R1 and the axis of translation T1 to be arranged parallel to the plane M, whereby the plane M is formed by the axis of rotation R1 situated in various positions. The structure thus formed, based on the flat machine bed set up with only one installation plane, can be manufactured simply and precisely, taking into account the necessary tolerances.

In conjunction with the formation and arrangement according to the invention, it is advantageous for the chip space to be provided adjacent to the working space, the chip space being delimited by at least one floor, two side walls and a back wall, whereby the height of the back wall is at least as large as the vertical extension of the working space. The chip space thus created ensures an optimal free space below the workpiece so that the chips formed, assisted by gravity, are carried out of the working area and fed to a removal opening of the chip space.

It is also advantageous for the chip space to have a removal opening in the area of the floor, downstream from which there is optionally a grinding unit. The chips falling downwards are transported by gravity to the removal opening. Consequently, further removal means are not necessary. Together with the removal opening, the chip space forms a funnel-shaped receptacle having a central collecting point.

Furthermore, it is advantageous for a workpiece loading means to be provided as a removal member between a workpiece belt and the workpiece spindle, said loading means being arranged below the tool holder relative to the horizontal. The workpieces are thus removed in the vertical direction from the horizontally arranged workpiece belt and carried in the horizontal direction to the horizontally arranged workpiece spindle.

The invention also relates to a method for machining a lens blank having an edge surface and at least one lens surface to be machined, in which process the lens blank rotates around the axis of rotation R1 and the tool holder is moved parallel to the axis of rotation R1 in the direction of an axis of oscillation O1 and at a right angle to the axis of oscillation O1 in the direction of an axis of translation T1, whereby the edge surface and the lens surface are each machined at least partially in a spiral pattern and the relative movement between the tool holder and the rotating lens blank forms a machining line.

Here, it is advantageous for the spiral machining of the edge surface to take place at least at a constant main feed a in the direction of the axis of rotation R1 and for the spiral machining of the lens surface to take place at least at a constant main feed r in the radial direction relative to the axis of rotation R1, whereby the spiral machining line of the edge surface follows the spiral machining line of the lens surface. Even though the machining lines are arranged spatially differently relative to the main feed and a secondary feed, they constitute a shared continuous machining line. The end of the one machining line is the beginning of the other machining line.

The spiral machining line of the edge surface—in addition to the constant main feed a in the direction of the axis of rotation R1—has a secondary feed ar in the radial direction relative to the axis of rotation R1. Hence, it is also possible to generate edge surfaces that are not cylindrical in shape. The spiral machining line of the lens surface—in addition to the constant main feed r in the radial direction relative to the axis of rotation R1—has a secondary feed ra in the direction of the axis of rotation R1. Hence, toroidal surfaces or free-form surfaces can also be generated.

The machining line here is formed by the relative movement between the tool holder and the rotating workpiece. During the machining of the edge surface, the machining line constitutes the actual machining groove or milling track on the surface. The same applies during the machining of the lens surface, as long as the lens blank has a round basic shape. In the case of oval or angular or polygonal basic shapes, the machining line and the actual machining groove coincide only partially, at least during the lathing. If the tool position is situated in the edge area relative to the radius of the workpiece and if it only makes contact with the workpiece in certain sections (in the area of the corners) relative to the angle of rotation α, then the machining line and the actual machining groove coincide. In the section of the angle of rotation a which complements each spiral curve, the tool is not on the workpiece surface, but rather it follows the spiral machining line.

During the milling of the lens surface, the machining line and the actual machining groove or machining track coincide, irrespective of the basic shape of the lens blank. Even with polygonal or angular basic shapes, the milling tool follows the shape of the lens blank or of the machining line, which is then likewise polygonal or angular in shape. This ensures time-efficient machining since the tool remains on the workpiece and does not perform any "empty cuts". Taking into consideration the dynamism according to the invention of the axis of oscillation O1 during the milling, this advantage can be fully utilized.

After the single-spiral edge machining for purposes of generating round, elliptical or angular shapes, the machining of the lens surface is carried out without any extra time being needed for a new start-up procedure. Here, the machining takes place on the shortest path along a continuous, one-piece and spiral machining line. Utilizing the given shape of the blank and taking into account the particular material properties such as the stiffness of the lens blank regarding its structure that remains, the single-spiral milling of the desired surface is carried out without interruptions.

Single-spiral milling can optionally be followed by a single-spiral dynamic lathing process, which ensures a maximum shape precision and, to this extent, a surface structure that can at least be polished. The basis for the extremely fast machining process - aside from the combined milling and lathe method—is the guarantee of the shortest possible machining path on the workpiece.

According to the invention, it is advantageous for a transition surface machined in a spiral pattern to be generated in the area between the edge surface and the lens surface, and for the spiral machining line of the transition surface to follow the spiral machining line of the lens surface and of the edge surface. The spiral machining of the edge surface ends at the outermost point of the lens blank that is situated in the boundary area between the edge surface and the lens surface on the one hand and that has a maximum distance from the middle point on the other hand. The transition from one surface to the other is tangential with respect to the surface that is to be created.

Finally, it is advantageous for the machining of the edge surface, of the lens surface and/or of the transition surface to be carried out with different pitches and/or main feeds a, r of the tool and for the transition between two machining lines to be generated at an outermost point of the surfaces in question, said point having a maximum distance vector to the middle point of the lens blank. In conjunction with the spiral machining, which presupposes a steady main feed, it is ensured that, at the beginning of the machining of the lens surface, the outermost point of the surface is machined first so that all of the points of the surface are machined. In this process, the edge surface, the transition surface and the lens surface are generated whereby, especially thanks to the generation of the transition surface, a sharp-edged geometry of the lens blank is prevented.

For this purpose, it is also advantageous for a lens blank having a round, oval, polygonal or angular basic shape to be created and for the tool to follow the basic shape of the workpiece during the production of the edge surface of the lens blank and to remain on the surface of the blank, whereby during the production of the lens surface of a non-round lens blank, the tool follows the basic shape of the workpiece, at least during the milling, and remains on the surface of the blank, and during the production of the lens surface of a non-round lens blank, the spiral machining line and an actual machining groove on the workpiece surface diverge from each other, at least during the lathing. In other words, during the lathing of a non-round basic shape of the lens blank, the tool leaves the surface of the blank in question, at least in the area of an angle of rotation $\alpha$. The spiral machining line and an actual machining groove on the workpiece surface diverge from each other.

The machining line here is formed by the relative movement between the tool holder and the rotating workpiece. In the machining of the edge surface, the machining line constitutes the actual machining groove on the surface. The same applies during the machining of the lens surface, as long as the lens blank has a round basic shape. In the case of oval or angular or polygonal basic shapes, the machining line and the actual machining groove coincide only partially. If the tool position is situated in the edge area relative to the radius of the workpiece and if it only has contact with the workpiece in certain sections there (in the area of the corners) relative to the angle of rotation $\alpha$, then the machining line and the actual machining groove coincide. In the section of the angle of rotation $\alpha$ which complements each spiral curve, the tool is not on the workpiece surface, but rather it follows the spiral machining line.

In addition, it is advantageous for the lens blank to be machined using the milling unit or the lathe unit and for the milling unit to be uncoupled from the tool drive and affixed to the machine bed in order to use the lathe unit, whereby the lathe unit is coupled to the tool drive when the milling unit is used. The tool drive can be associated with both, namely, the lathe chisel unit and the milling unit, whereby preferably the lathe unit can be coupled only to the drive and the milling unit only together with the lathe unit. Thus, the lathe unit is firmly affixed to the drive. Since the milling procedure or the movement in the direction of the axis of oscillation O1 during the milling has a much lower frequency, this oscillating milling movement can be mastered by the one drive, in spite of the two weights of the lathe unit and the milling unit. In addition, there is one drive for each unit, whereby the units are each connected individually to the drive, while the other unit is positioned in a parked position on the machine bed. Greater dynamism is ensured, thanks to the weight advantage of each individual pairing of the unit with the drive. The coupling of the two units to the shared drive is no longer necessary.

Moreover, it is advantageous that, during the milling or lathing procedure, the main feed r takes place radially in the direction of the axis of translation T1 and the main feed a takes place axially in the direction of the axis of oscillation O1, whereby the feeds r, a take place individually or are superimposed. The superimposition serves to form an edge surface that is not cylindrical and a transition surface as well as the lens surface, which each have an axial and a radial feed component. The spiral machining line of the edge surface—in addition to the constant main feed a in the direction of the axis of rotation R1—has a secondary feed ar in the radial direction relative to the axis of rotation R1. Hence, it is also possible to generate edge surfaces that are not cylindrical in shape. The spiral machining line of the lens surface—in addition to the constant main feed r in the radial direction relative to the axis of rotation R1—has a secondary feed ra in the direction of the axis of rotation R1. Hence, toroidal surfaces or free-form surfaces can also be generated. Depending on the shape of the transition surface, the spiral machining line of the transition surface has essentially an equivalent superimposition of the feed r in the radial direction towards the axis of rotation R1 and of the feed a in the direction of the axis of rotation R1.

It is also advantageous, during the lathing procedure, in a first machining step, for the rotational speed $\overline{\omega}d$ of the lens blank to be increased from a starting value $\overline{\omega}sd$ at the beginning of the machining to a final value wed at the end of the machining or else to be kept constant, whereby the rotational speed $\overline{\omega}d$ is set at a value between 750 rpm and 6000 rpm, and for the distance δd between two adjacent machining grooves to be changed from a starting value δsd at the beginning of the machining to a final value δed at the end of the machining of the lens blank or else to be kept constant, whereby the distance δd is set at a value between 0.05 mm and 0.2 mm. The value ranges thus selected ensure an optimal surface quality, whereby taking the lathing process into consideration, the rotational speed during the machining of the middle point of the workpiece has to reach a maximum.

In this context, it is advantageous, during the milling procedure, in a first machining step, for the rotational speed of the lens blank to be increased from a starting value $\overline{\omega}sf$ at the beginning of the machining to a final value $\overline{\omega}ef$ at the end of the machining or else to be kept constant, whereby the rotational speed $\overline{\omega}f$ is set at a value between 70 rpm and 1000 rpm, and for the distance δf between two adjacent machining grooves to be changed from a starting value δsf at the beginning of the machining to a final value δef at the end of the machining of the lens blank or else to be kept constant, whereby the machining grooves are produced at a distance δf between 1 mm and 6 mm. During the use of a milling tool, and the resultant extension of the cutting line, especially in the radial direction, it is not necessary to start up the cutting tool at the middle point of the lens blank. Taking the desired roughness into account, the middle point is determined on the basis of the symmetry of the milling tool or its machining geometry. Depending on the desired residual surface roughness, the milling can be ended at a distance Δr from the middle point so that, in order to ensure sufficient cutting speeds, increasing the speed of the workpiece is only necessary to a limited extent. During the milling, only relatively short chips are generated, which can be removed quickly and easily.

Finally, it is advantageous for the rotational speed of the milling tool of the milling unit to be set between 15,000 rpm and 50,000 rpm. As the speed increases, the chip depth decreases, so that the generated surface quality is improved. The breakage behavior during each shearing procedure is improved and the surface created by milling can then be subsequently polished.

BRIEF DESCRIPTION OF THE DRAWINGS

Additional advantages and details of the invention are explained in the patent claims and in the description and shown in the figures. The figures show the following:

DETAILED DESCRIPTION

Figure 1:
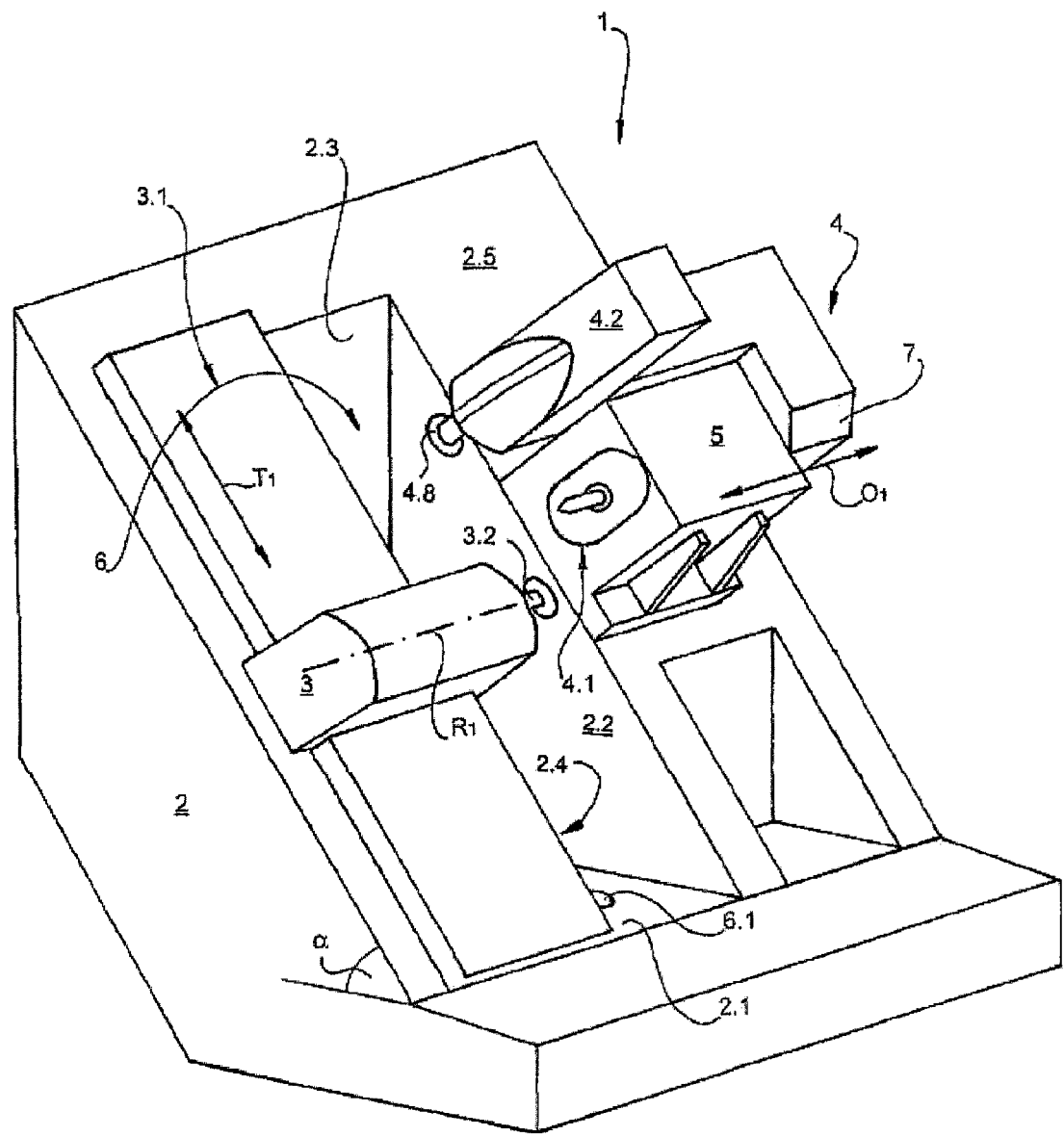
FIG. 1: a schematic diagram of the milling-lathe unit, in a perspective view.

The device 1 shown in FIG. 1 has a machine bed 2 set up at an angle α relative to the horizontal. The angle α between a machine bed main surface 2.5 and the horizontal is about 50° here. The machine bed 2 also has a chip space 6 arranged approximately in the middle, which is formed by a floor 2.1, a right-hand side wall 2.2, a left-hand side wall 2.4 and a back wall 2.3 of the machine bed 2. Here, the floor 2.1 is oriented essentially horizontally, whereas the back wall 2.3 and the side walls 2.2, 2.4 are oriented essentially vertically. With respect to the machine bed main surface 2.5, which is set up at an angle α relative to the horizontal, the chip space 6 has an approximately triangular or roof-like basic shape.

In the floor 2.1 of the machine bed 2 or of the chip space 6, there is a removal opening 6.1 for chips and cutting fluid.

On the machine bed main surface 2.5, which is essentially formed by the individual faces of the two side walls 2.2, 2.4, there is a tool holder 4 with a translatory tool drive 5 as well as a workpiece holder 3 with a workpiece spindle 3.2 and a translatory workpiece drive 3.1.

The workpiece holder 4 here is situated in the area of the right-hand side wall 2.2 or on its face as part of the machine bed main surface 2.5. The workpiece drive 5 of the workpiece holder 4 has an axis of oscillation O1 that runs parallel to the machine bed main surface 2.5 and in the horizontal direction.

The workpiece holder 4 consists of a lathe chisel unit 4.1 and a milling unit 4.2. The lathe chisel unit 4.1 is associated directly with the tool drive 5 or is arranged directly on it, whereas the milling unit 4.2 can be connected to the tool drive 5 by means of a coupling unit 7 shown in FIG. 3. In addition, the milling unit 4.2 is supported on the tool drive 5 via a translatory sliding bearing 4.6' according to FIG. 2. Therefore, via the tool drive 5 or its axis of oscillation O1, the lathe chisel unit 4.1 on the one hand and the milling unit 4.2 on the other hand can be moved translatorily in the direction of the axis of oscillation O1.

In addition to the tool holder 4 on the right-hand side wall 2.2, the device 1 has a workpiece spindle 3.2 with its workpiece drive 3.1 in the area of the left-hand side wall 2.4. The workpiece drive 3.1 is configured as a linear drive and has an axis of translation T1 that is arranged parallel to the machine bed main surface 2.5 and at a right angle to the axis of oscillation O1. The workpiece holder 3 or the workpiece spindle 3.2 has an axis of rotation R1 that is arranged at a right angle to the axis of translation T1 and parallel to the axis of oscillation O1. The axis of rotation R1 and the axis of oscillation O1 lie in a shared plane M that is shown in FIG. 2 and that is spanned by the axis of rotation R1 relative to its different positions in the direction of the axis of translation T1.

Figure 2:
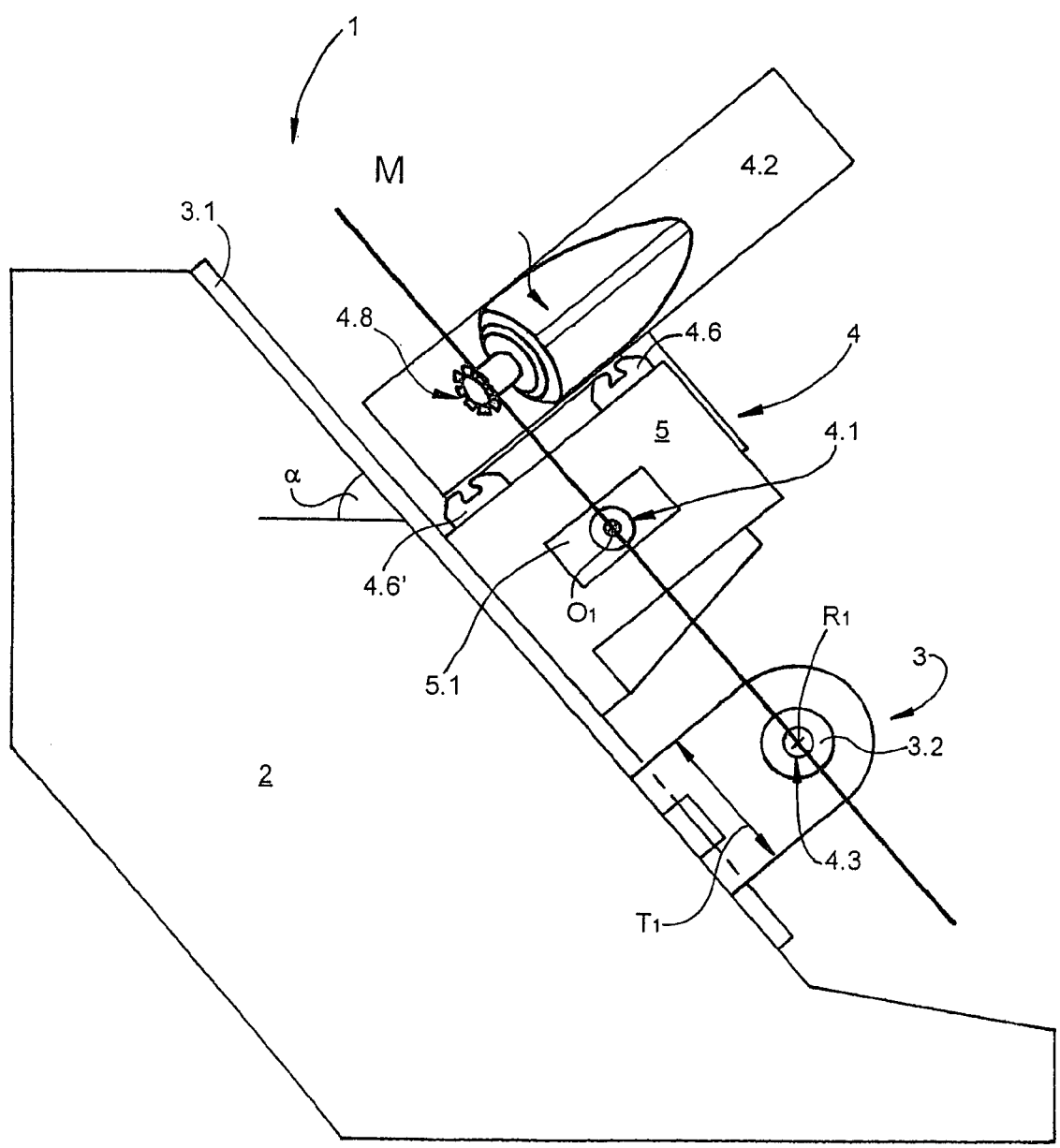
FIG. 2: a side view of the schematic diagram.

The side view according to FIG. 2 shows the tool holder 4 with the lathe chisel unit 4.1, the milling unit 4.2 and the shared drive 5. The milling unit 4.2 is supported on the tool drive 5 via the sliding bearings 4.6, 4.6'. In addition, the milling unit 4.2 has holding elements (not shown here) by means of which the milling unit 4.2 can be affixed on the machine bed 2.

Via the workpiece drive 3.1, which extends essentially over the entire height or width of the machine bed 2, the workpiece holder 3 or the workpiece spindle 3.2 can travel over precisely this width or length in the direction of the axis of translation T1. Hence, the workpiece can be moved into the working area of the lathe chisel unit 4.1 on the one hand and into the working area of the milling unit 4.2 on the other hand.

Figure 3:
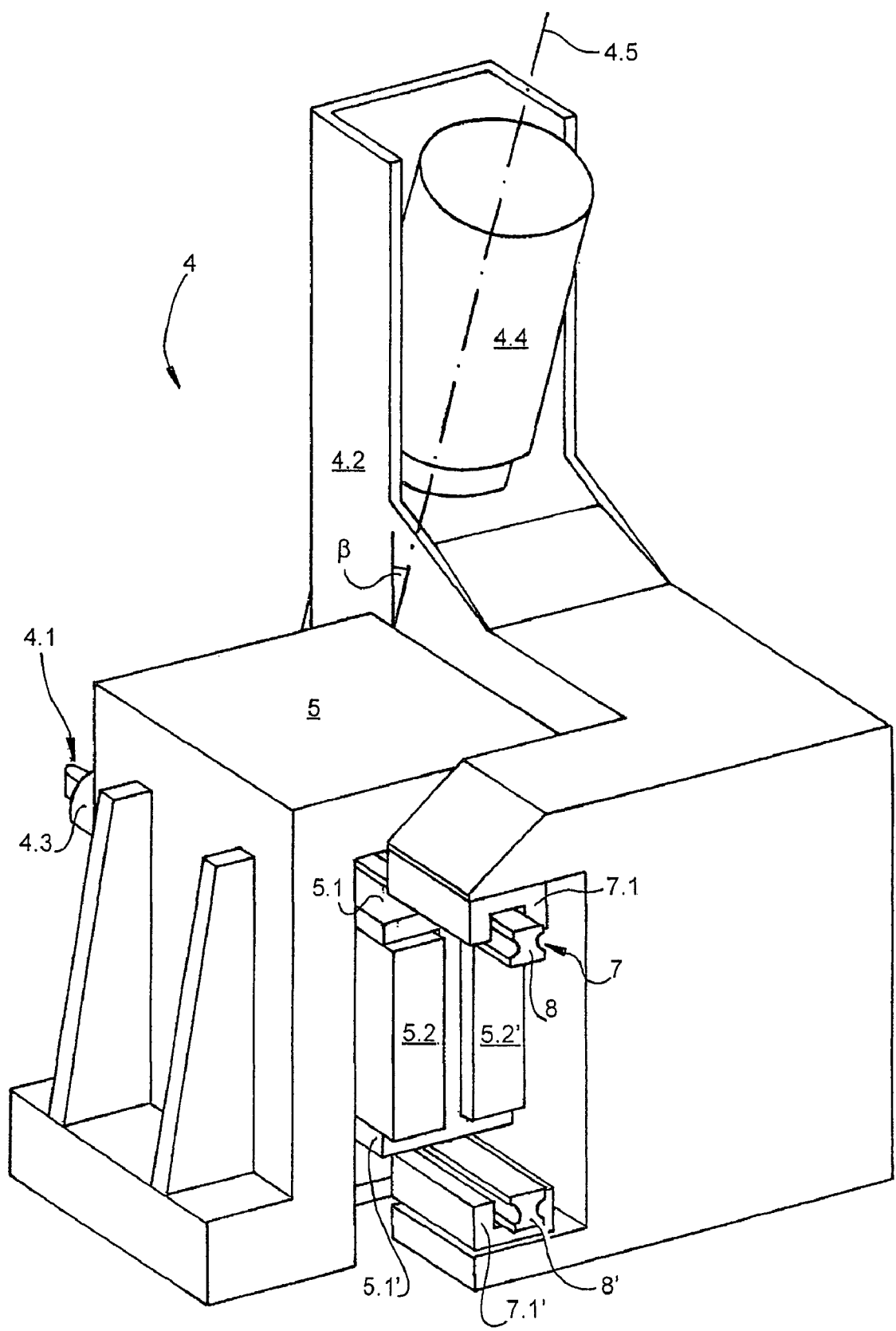
FIG. 3: a schematic diagram of the milling-lathe unit with the tool drive, in a perspective view.

The workpiece holder 4 according to FIG. 3—in addition to the tool drive 5 arranged on the machine bed 2 (not shown here)—has the lathe chisel unit 4.1 as well as the milling unit 4.2 arranged directly on the tool drive 5. First of all, the milling unit 4.2 is arranged movably on the tool drive 5 via the sliding bearings 4.6, 4.6' shown in FIG. 2. Moreover, the milling unit 4.2 can be connected by means of holding elements (not shown here) to the machine bed 2 not shown in FIG. 3. In an embodiment not shown here, the holding element is a hydraulic cylinder arranged on the machine bed that detachably affixes or positions the milling unit in a final position within the sliding bearings.

The tool drive 5 or its housing, together with the two winding units 5.2, 5.2', form the stator unit in which there is a translatorily mounted rotor 5.1. The rotor 5.1 here has a pair of bearing rails 8 by means of which the rotor 5.1 is supported translatorily in the housing 5. Here, the appertaining bearing rail 8 is supported via sliding bearings (not shown here) on the inside of the housing wall 5. The lathe chisel unit 4.1 or the lathe chisel 4.3 is arranged on the rotor 5.1.

During the translatory movement or the oscillation movement of the rotor 5.1 in the direction of the axis of oscillation O1, the appertaining bearing rail 8, 8' likewise oscillates. Via a coupling device 7 or two coupling jaws 7.1, 7.1', the milling unit 4.2 can be coupled directly to the rotor 5.1. The rotor 5.1 thus also constitutes the oscillating drive for the milling unit 4.2 whereby, in order to ensure this oscillation movement, the milling unit 4.2 is arranged on the tool drive 5 via the translatory sliding bearings 4.6, 4.6' shown in FIG. 2.

Hence, there are basically two movement states. First of all, the rotor 5.1 moves with the lathe chisel unit 4.1 as well as with the milling unit 4.2 synchronously in the direction of the axis of oscillation O1. Secondly, when the milling unit 4.2 is separated from the rotor 5.1 or from the appertaining bearing rail 8 by means of the coupling unit 7 and when said milling unit 4.2 is connected to the machine bed 2 by means of the locking elements (not shown here), then only the rotor 5.1 oscillates with the lathe chisel unit 4.1.

According to FIG. 2, the milling unit 4.2 has a milling head 4.8. A tool axis 4.5 of the milling cutter 4.4 subtends an angle β of approximately 20° with a plane running at a right angle to the axis of oscillation O1.

The invention claimed is:

1. A device for milling and/or lathing a workpiece, comprising:
   at least one machine bed;
   at least one tool holder disposed on the machine bed and having at least one tool drive with an axis of oscillation;
   a workpiece holder having a workpiece spindle with an axis of rotation disposed parallel to the axis of oscillation;
   wherein the workpiece holder and the tool holder are moveable relative to each other in a direction of an axis of translation disposed at a right angle to the axis of oscillation, and wherein the workpiece holder has a linear drive that is moveable in the direction of the axis of translation,
   wherein the machine bed defines a plane M disposed at an angle α between 40° and 60° with the horizontal, wherein the axis of translation is disposed at the angle α with the horizontal,
   wherein the machine bed includes a chip space disposed below the workpiece spindle between the workpiece holder and the tool holder relative to the axis of oscillation, the chip space being delimited by at least one floor, two side walls, and a back wall, the back wall extending at least as high as the workpiece spindle.

2. The device as recited in claim 1, wherein the angle α approximates 50°.

3. The device as recited in claim 1, wherein the at least one tool holder has a lathe chisel unit and a milling unit, each of which are couplable individually or jointly to the at least one tool drives.

4. The device as recited in claim 1, wherein the at least one tool holder has a lathe chisel unit and a milling unit, each of which lockable in a parked position on the machine bed.

5. The device as recited in claim 1, wherein the linear drive is configured as one of a spindle drive and a linear motor and wherein the tool drive is configured as a linear motor.

6. The device as recited in claim 1, wherein the linear motor has a rotor having a bearing rail, and further comprising at least one rolling-element bearing disposed on the bearing rail, wherein the rotor is translatorily supported via the at least one rolling-element bearing, wherein the at least one rolling-element bearing includes at least one of a hydrostatic bearing and a pneumatically static bearing.

7. The device as recited in claim 1, wherein the axis of oscillation, the axis of rotation, and the axis of translation are disposed parallel to the plane M, and wherein the plane M is formed by the axis of rotation situated in various positions.

8. The device as recited in claim 1, wherein the chip space has a removal opening in an area of the floor.

9. The device as recited in claim 8, further comprising a grinding unit downstream from the removal opening.

* * * * *